United States Patent
Smith

(10) Patent No.: US 9,012,791 B2
(45) Date of Patent: Apr. 21, 2015

(54) SPLIT, NON-METALLIC ELECTRICAL INSULATING BUSHING

(71) Applicant: Bridgeport Fittings, Inc., Stratford, CT (US)

(72) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 34 days.

(21) Appl. No.: 13/974,739

(22) Filed: Aug. 23, 2013

(65) Prior Publication Data

US 2015/0053476 A1 Feb. 26, 2015

(51) Int. Cl.
| | |
|---|---|
| H02G 3/18 | (2006.01) |
| H01R 4/64 | (2006.01) |
| H01R 4/28 | (2006.01) |
| H02G 3/22 | (2006.01) |

(52) U.S. Cl.
CPC ........................................ *H02G 3/22* (2013.01)

(58) Field of Classification Search
CPC .................................... H01R 4/72; H02G 3/22
USPC ........... 174/666, 650, 77, 151, 152, 659, 668, 174/660, 664, 652; 439/367, 92, 100; 248/406, 412
See application file for complete search history.

(56) References Cited

U.S. PATENT DOCUMENTS

| | | | |
|---|---|---|---|
| 2,279,866 A | 4/1942 | Ellinwood | |
| 3,117,388 A | 1/1964 | Clarke | |
| 3,258,523 A | 6/1966 | Leonard et al. | |
| 3,365,693 A | 1/1968 | Browne | |
| 3,456,965 A | 7/1969 | Gajewski et al. | |
| 3,492,625 A | 1/1970 | Bromberg | |
| 3,609,631 A | 9/1971 | Looney | |
| 3,643,203 A | 2/1972 | McLaughlin et al. | |
| 3,836,269 A * | 9/1974 | Koscik .......................... | 403/197 |
| 3,913,187 A | 10/1975 | Okuda | |
| 3,967,872 A | 7/1976 | Mooney et al. | |
| 4,159,859 A | 7/1979 | Shemtov | |
| 4,176,756 A | 12/1979 | Gellman | |
| 4,189,198 A | 2/1980 | Reichman | |
| 4,233,469 A | 11/1980 | Steppe | |
| 4,478,381 A | 10/1984 | Pittion et al. | |

(Continued)

FOREIGN PATENT DOCUMENTS

| | | |
|---|---|---|
| DE | 69707913 T2 | 6/2002 |
| EP | 2141397 A1 | 1/2010 |

*Primary Examiner* — Angel R Estrada
*Assistant Examiner* — Dimary Lopez Cruz
(74) *Attorney, Agent, or Firm* — Ware, Fressola, Maguire & Barber LLP

(57) ABSTRACT

A split, non-metallic electrical insulating bushing for placement on a terminating end of an electrical conduit, the bushing rotatable between a first open configuration and a second closed configuration and having first and second hemispherically shaped bushing portions. Both bushing portions have a first end and a second end. The first ends are dimensioned to rotate with respect to each other. The second end of the first bushing portion has a projecting clasp member with a hook portion, while the second end of the second bushing portion has a recess dimensioned for receipt of the projecting clasp member. The clasp member is angled relative to the recess so that the hook portion contacts the second bushing portion so as to align the first and second bushing portions as the clasp member enters the recess. The hook portion then extends through the recess to secure the bushing in its closed configuration.

9 Claims, 12 Drawing Sheets

(56) References Cited

U.S. PATENT DOCUMENTS

| | | | | |
|---|---|---|---|---|
| 4,637,097 | A | 1/1987 | Secord | |
| 4,729,534 | A * | 3/1988 | Hill et al. | 248/56 |
| 5,101,129 | A * | 3/1992 | Butcher | 310/68 C |
| 5,245,131 | A * | 9/1993 | Golden et al. | 174/652 |
| 5,305,978 | A | 4/1994 | Current | |
| 5,306,973 | A * | 4/1994 | Butcher et al. | 310/68 C |
| 5,385,373 | A | 1/1995 | Love | |
| 5,504,973 | A * | 4/1996 | Kameyama | 16/2.1 |
| 5,653,481 | A | 8/1997 | Alderman | |
| 5,820,048 | A | 10/1998 | Shereyk et al. | |
| 5,873,611 | A | 2/1999 | Munley et al. | |
| 5,906,342 | A | 5/1999 | Kraus | |
| 6,030,006 | A | 2/2000 | Lin | |
| 6,161,589 | A | 12/2000 | Bolotte et al. | |
| 6,164,604 | A | 12/2000 | Cirino et al. | |
| 6,211,465 | B1 * | 4/2001 | Streit | 174/653 |
| 6,561,471 | B1 | 5/2003 | Hawie | |
| 6,708,377 | B2 | 3/2004 | Maunder | |
| 6,840,782 | B1 | 1/2005 | Borden et al. | |
| 7,178,203 | B2 | 2/2007 | Pearson et al. | |
| 7,182,611 | B2 | 2/2007 | Borden et al. | |
| 7,481,247 | B2 | 1/2009 | Friedline et al. | |
| 7,740,211 | B2 | 6/2010 | Dukes | |
| 7,915,545 | B1 | 3/2011 | Bixler et al. | |
| 8,157,222 | B1 | 4/2012 | Shirey et al. | |
| 8,220,113 | B2 | 7/2012 | Morton et al. | |
| 8,231,392 | B2 | 7/2012 | Garvin | |
| 8,246,095 | B2 | 8/2012 | Radle et al. | |
| 8,328,458 | B2 | 12/2012 | Werth | |
| 8,419,449 | B1 | 4/2013 | Smith | |
| 8,882,517 | B2 | 11/2014 | Smith et al. | |
| 2005/0205722 | A1 | 9/2005 | Krueger | |

\* cited by examiner

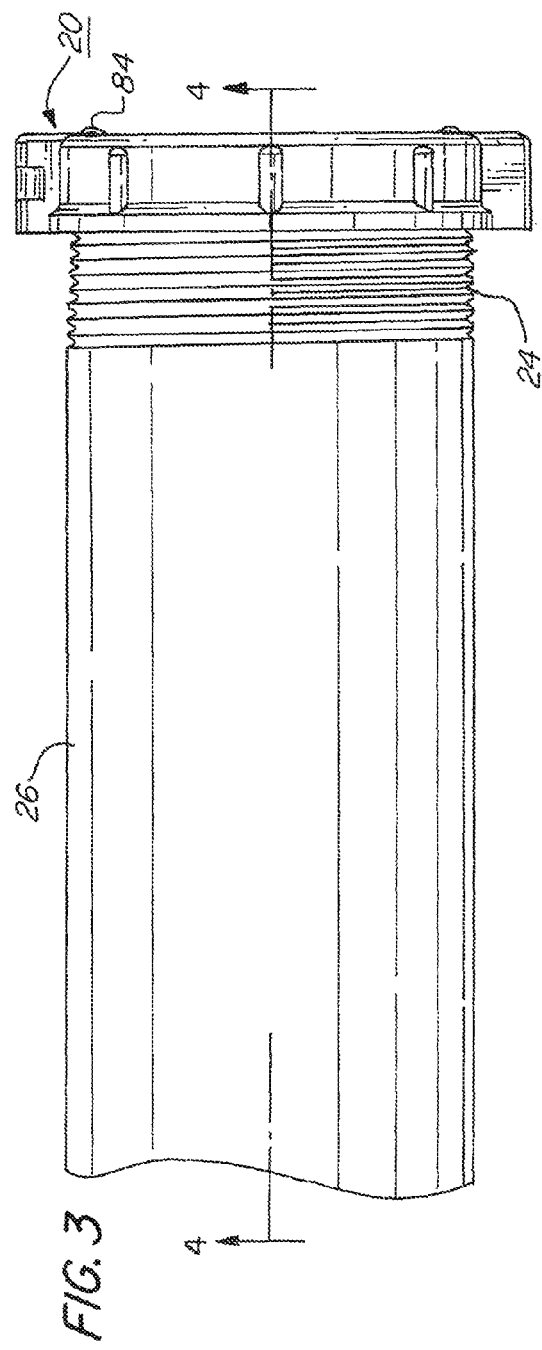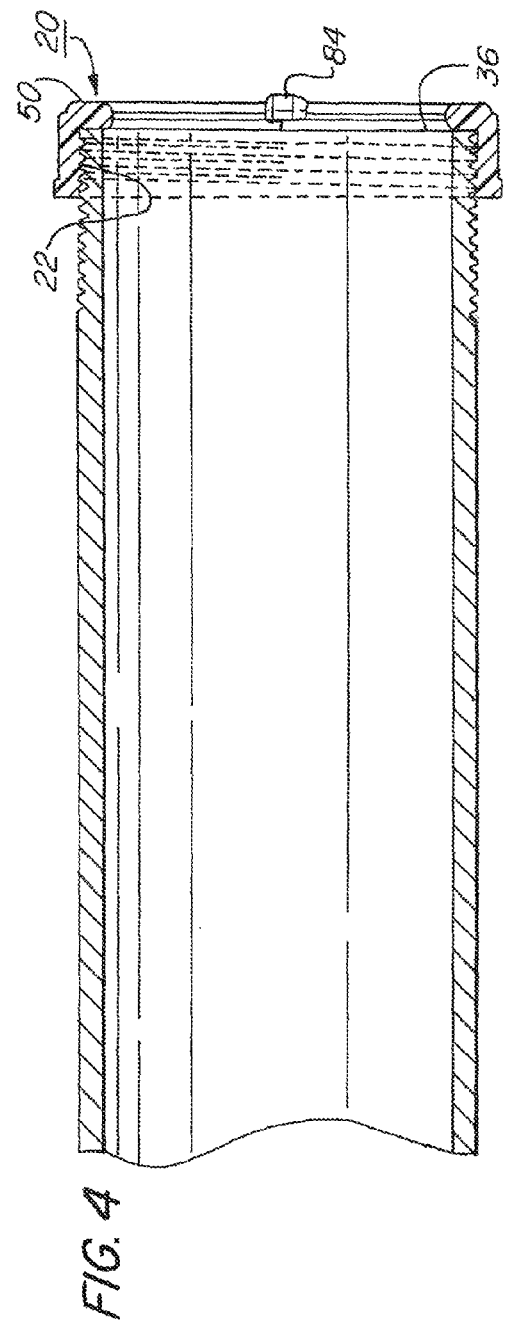
FIG. 3
FIG. 4

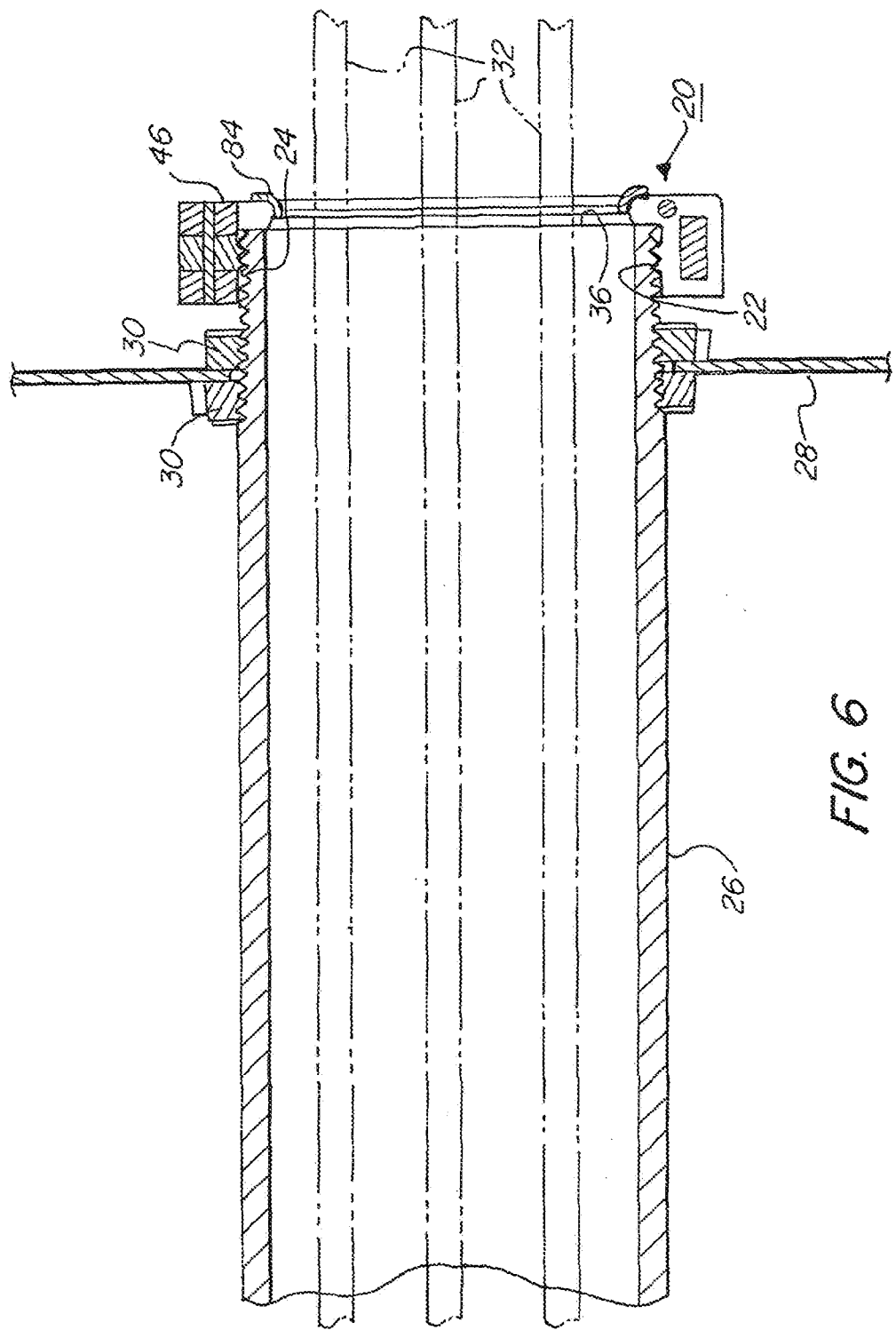

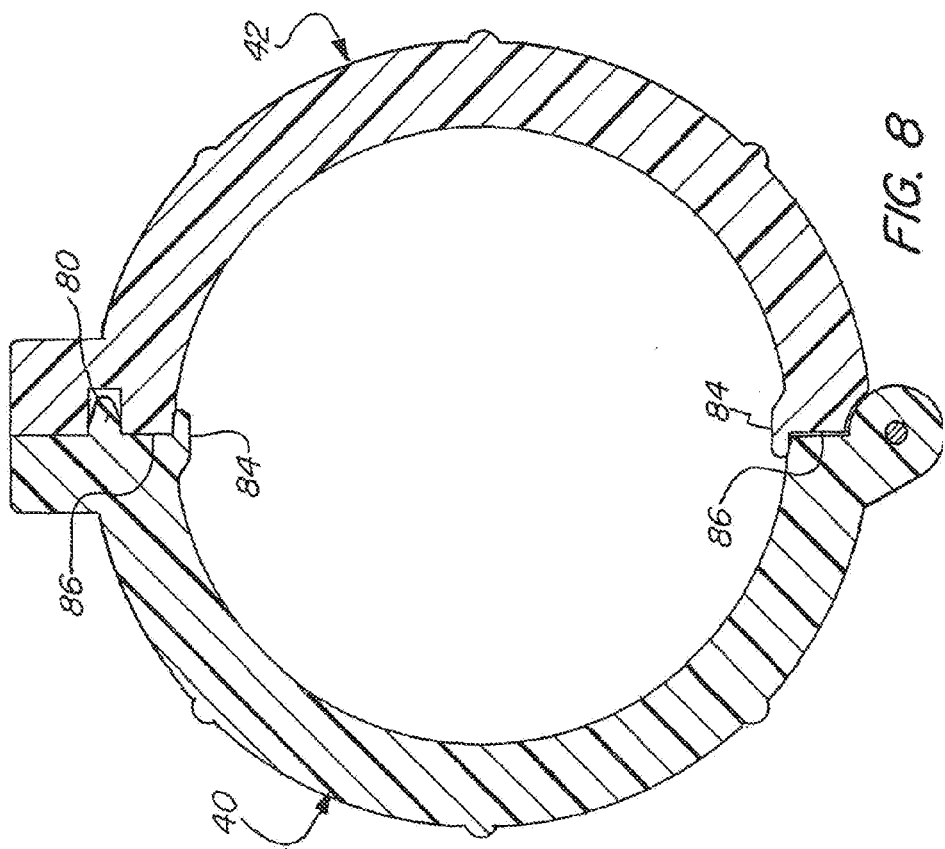
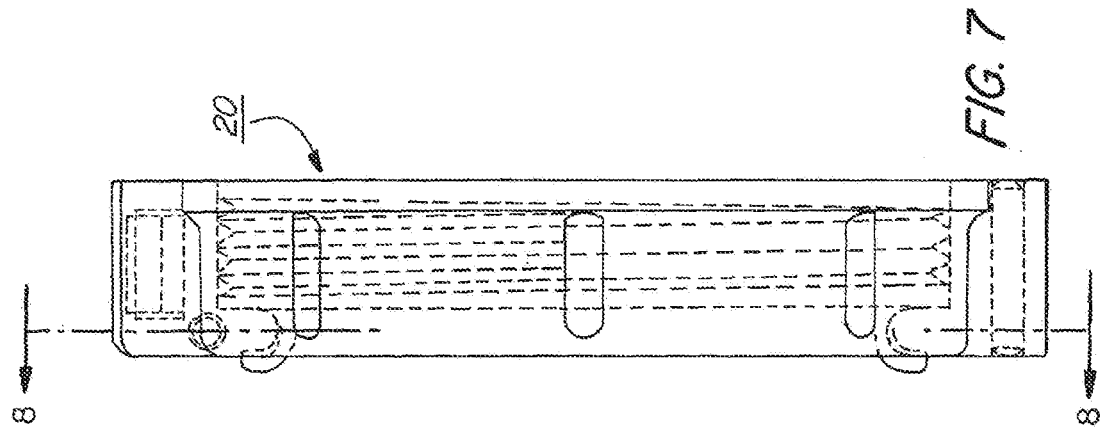

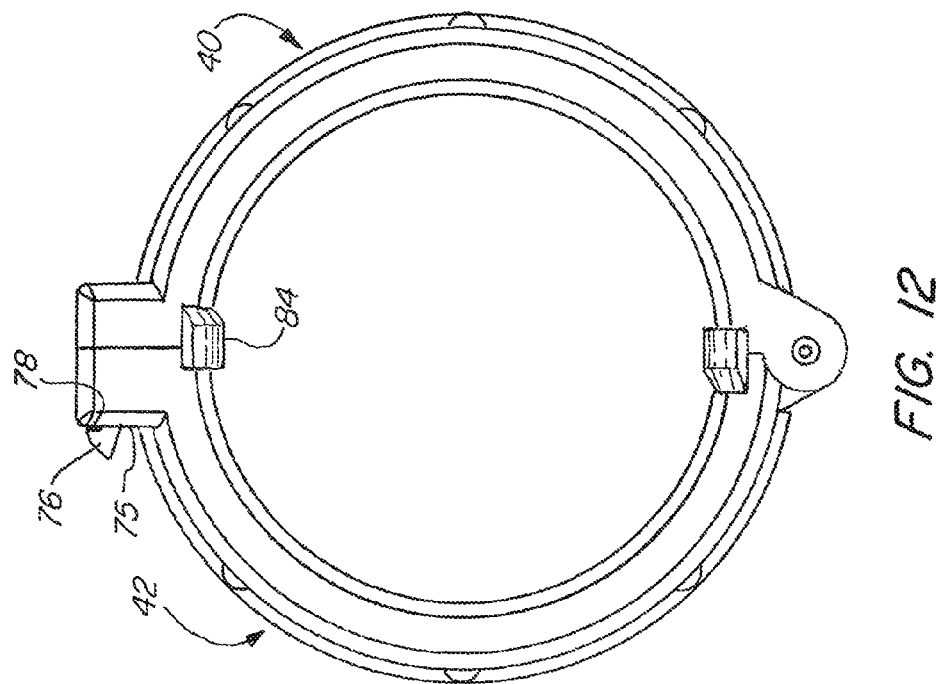
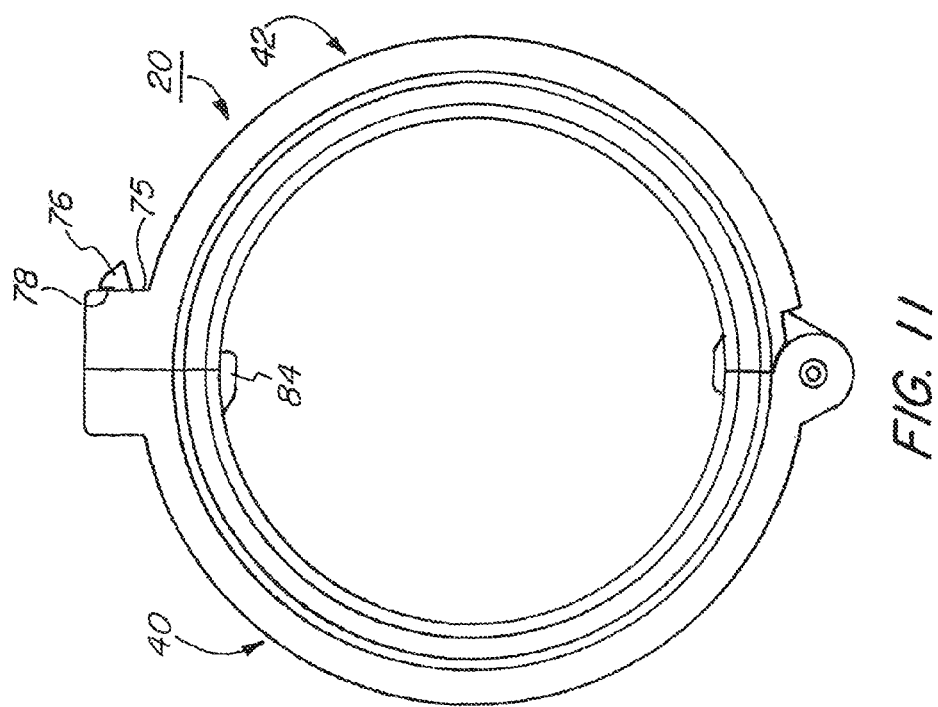

SPLIT, NON-METALLIC ELECTRICAL INSULATING BUSHING

TECHNICAL FIELD

The present invention relates to the field of electrical insulating bushings, particularly those for placement on a terminating end of an electrical conduit so as to prevent damage to insulated electrical conductors passing out of the conduit end.

BACKGROUND OF THE INVENTION

Electrical insulating bushings are known in the electrical fitting art and are typically installed on the terminal end of an electrical conduit so as to protect insulated electrical conductors passing through the conduit from coming into contact with the terminating end of the electrical conduit. Such electrical conduits are typically fabricated from metal and their terminating ends therefore are able to chafe the insulation on electrical conductors passing through the conduits, especially if such conductors make a bend as they exit the electrical conduits.

Although such non-metallic electrical insulating bushings are required to be placed on the end of electrical conduits by the National Electrical Code and/or various local electrical codes, it is possible during electrical installation at a building site that such bushings are not installed prior to pulling the electrical conductors through the electrical conduits used at the building site.

Therefore, it is particularly advantageous to have a non-metallic electrical insulating bushing that can be installed to a terminating an end of an electrical conduit after electrical conductors have been pulled through that conduit.

SUMMARY OF THE INVENTION

One aspect of the present invention is a split, non-metallic electrical insulating bushing for placement on a terminating end of an electrical conduit, the bushing rotatable between a first open configuration and a second closed configuration comprising a first electrical insulating bushing portion having a substantially hemispherical shape with a first end and a second end, the first bushing portion including a rim, a second electrical insulating bushing portion having a substantially hemispherical shape with a first end and a second end, the first end dimensioned to rotate with the first end of the first insulating bushing portion, the second bushing portion including a rim, and means, such as a hinge pin, for allowing the first end of the first insulating bushing portion and the first end of the second insulating bushing portion to rotate with respect to each other, wherein the second end of the first insulating bushing portion comprises a projecting clasp member, wherein the second end of the second insulating bushing portion has a recess formed therein dimensioned for receipt of the projecting clasp member, wherein the projecting clasp member has a hook portion, the hook portion having a surface angled relative to the recess when the first insulating bushing portion and second insulating bushing portion are rotated toward each other so as to align the second ends of the first insulating portion and the second insulating portion with respect to each other as the hook portion contacts a surface of the second insulating bushing portion forming the recess, and wherein the hook portion further extends through the recess so as to secure the bushing in its second closed configuration. Another aspect of the present invention is a split, non-metallic electrical insulating bushing, wherein the hook portion includes an underlying surface for snap secure engagement with the surface of the second insulating bushing portion forming the recess.

A further aspect of the present invention is a split, non-metallic electrical insulating bushing, wherein the second end of the first insulating portion further comprises a projecting pin and wherein the second end of the second insulating portion further has an orifice formed therein dimensioned for receipt of the projecting pin when the split, non-metallic insulating bushing is in its second closed configuration, thereby providing enhanced securement of the split non-metallic insulating bushing when in the second closed configuration.

A still further aspect of the present invention is a split, non-metallic electrical insulating bushing, wherein the first bushing portion has a flange attached to the rim that projects radially inward so as to overlie the terminating end of an electrical conduit when installed thereon and wherein the second bushing portion has a flange attached to the rim that projects radially inward so as to overlie the terminating end of an electrical conduit when installed thereon.

Another aspect of the present invention is a split, non-metallic electrical insulating bushing, wherein the rim of the first insulating bushing portion and the rim of the second insulating bushing portion each include threads formed on an interior surface thereof, the threads dimensioned for threading engagement with threads formed on a terminating end of an electrical conduit.

A further aspect of the present invention is a split, non-metallic electrical insulating bushing, wherein one end of the first insulating bushing portion has a seam cover that is dimensioned to overlie a gap between the end and the corresponding end of the second insulating bushing portion when the bushing is in the second closed configuration and wherein the second insulating bushing portion includes a seam cover that is dimensioned to overlie a gap between its other end and the corresponding other end of the first insulating bushing portion when the bushing is in the second closed configuration.

Another aspect of the present invention is a split, non-metallic electrical insulating bushing, wherein the first end of the first insulating bushing portion and the first end of the second insulating bushing portion are rotatably secured to each other by a hinge pin.

A further aspect of the present invention is a split, non-metallic electrical insulating bushing, wherein the rim of the first insulating bushing portion and the rim of the second insulating bushing portion end each include a plurality of ribs dimensioned to assist gripping the bushing.

A still further aspect of the present invention is a split, non-metallic electrical insulating bushing, wherein the first insulating bushing portion and the second insulating bushing portion are formed from a thermoplastic material.

Another aspect of the present invention is a split, non-metallic electrical insulating bushing, wherein the hinge pin is fabricated from zinc plated steel.

BRIEF DESCRIPTION OF THE DRAWINGS

For a fuller understanding of the nature and objects of the present invention reference should be made to the following detailed description taken in conjunction with the following drawings in which:

FIG. 3 is a side view of the non-metallic electrical insulating bushing attached to an electrical conduit.

FIG. 4 is a cross-sectional view of the non-metallic electrical insulating bushing and conduit taken along line 4-4 of FIG. 3.

FIG. 6 is a cross-sectional view of the non-metallic electrical insulating bushing and electrical conduit taken along line 6-6 of FIG. 5.

FIG. 7 is a side cross-sectional view of the non-metallic electrical insulating bushing.

FIG. 8 is a cross-sectional view of the non-metallic electrical insulating bushing taken along line 8-8 of FIG. 7.

FIG. 11 is a bottom view of the non-metallic electrical insulating bushing.

FIG. 12 is a top view of the non-metallic electrical insulating bushing.

DETAILED DESCRIPTION

Figure 1:
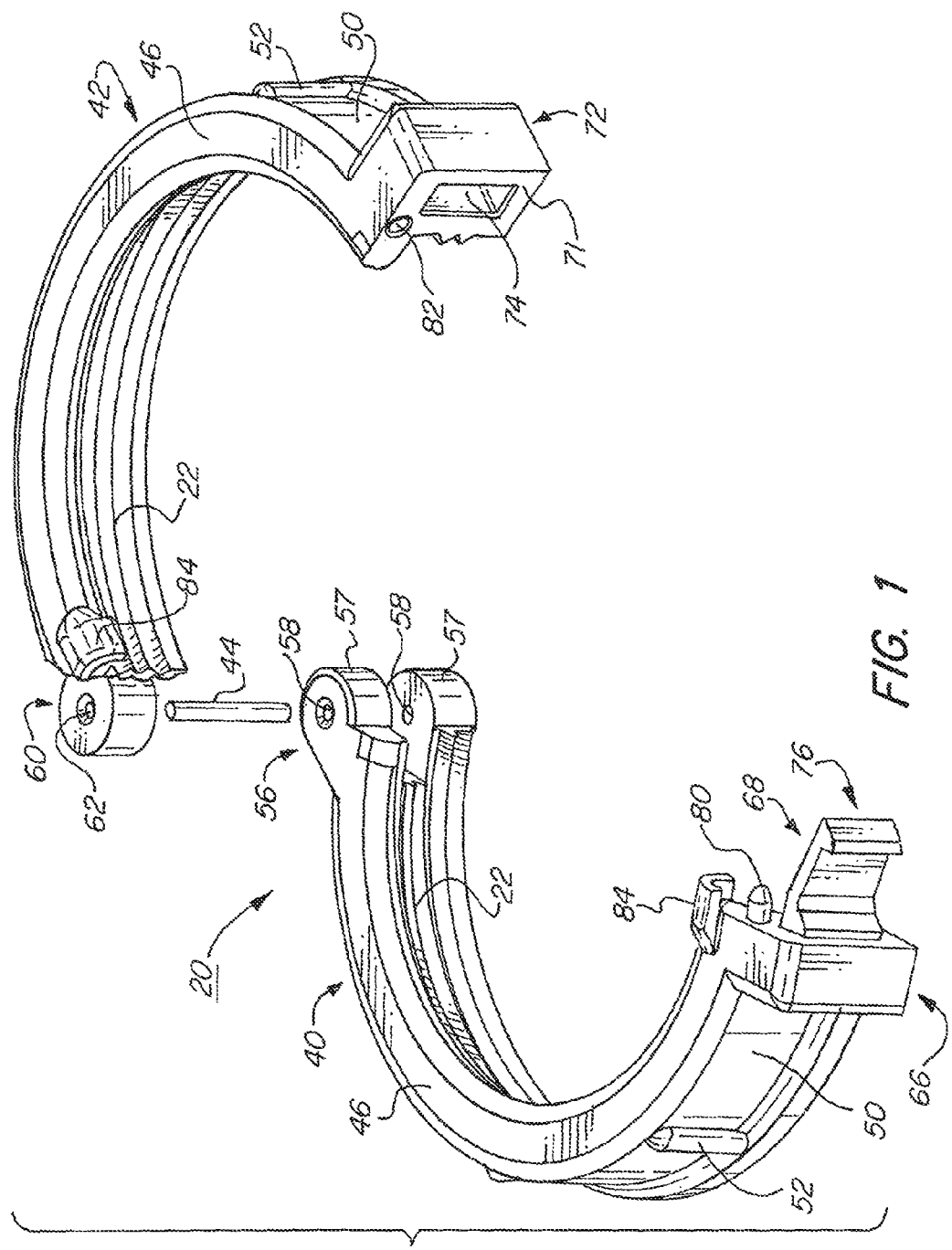
FIG. 1 is an exploded perspective view of the non-metallic electrical insulating bushing according to an embodiment of the present invention showing the bushing in its open configuration.
Figure 1A:
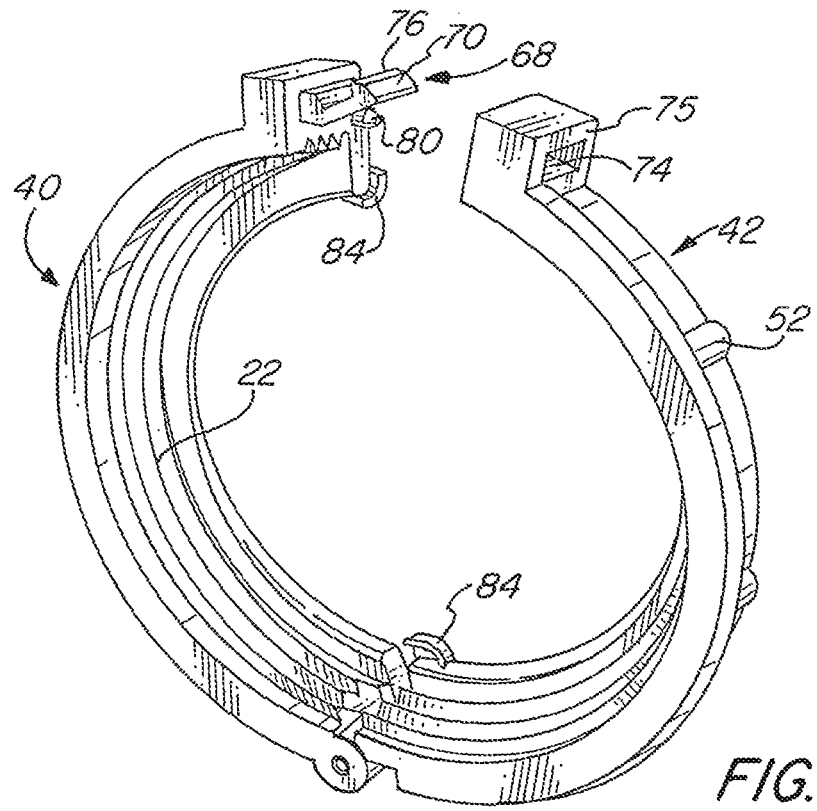
FIG. 1A is a bottom perspective view of the non-metallic electrical insulating bushing shown in FIG. 1 taken from a conduit inlet end showing the bushing in its open configuration.
Figure 1B:
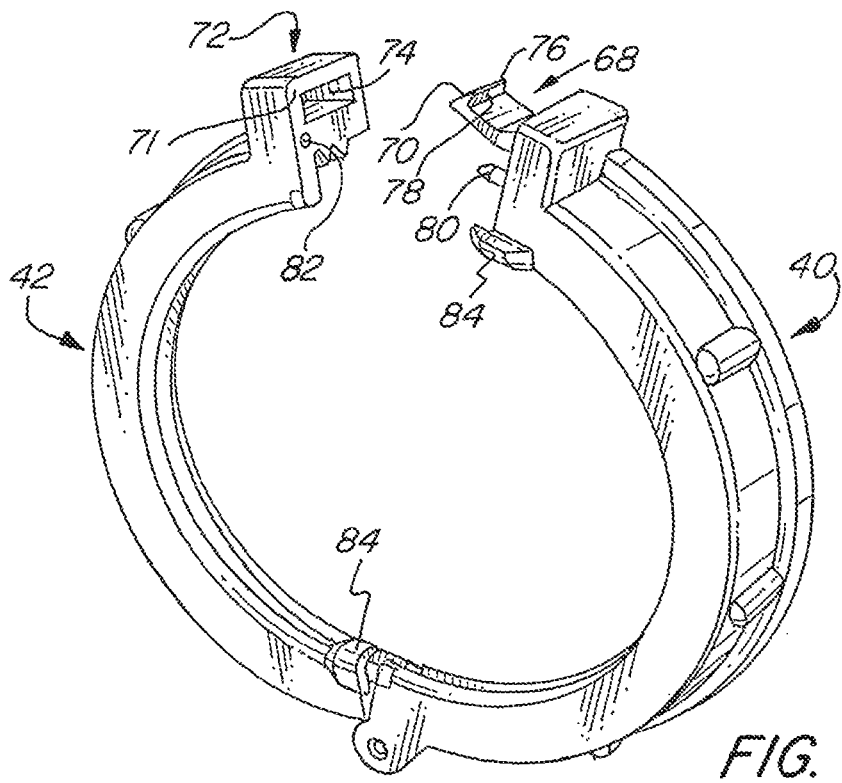
FIG. 1B is a top perspective view of the non-metallic electrical insulating bushing shown in FIG. 1 taken from a conduit outlet end showing the bushing in its open configuration.
Figure 2:
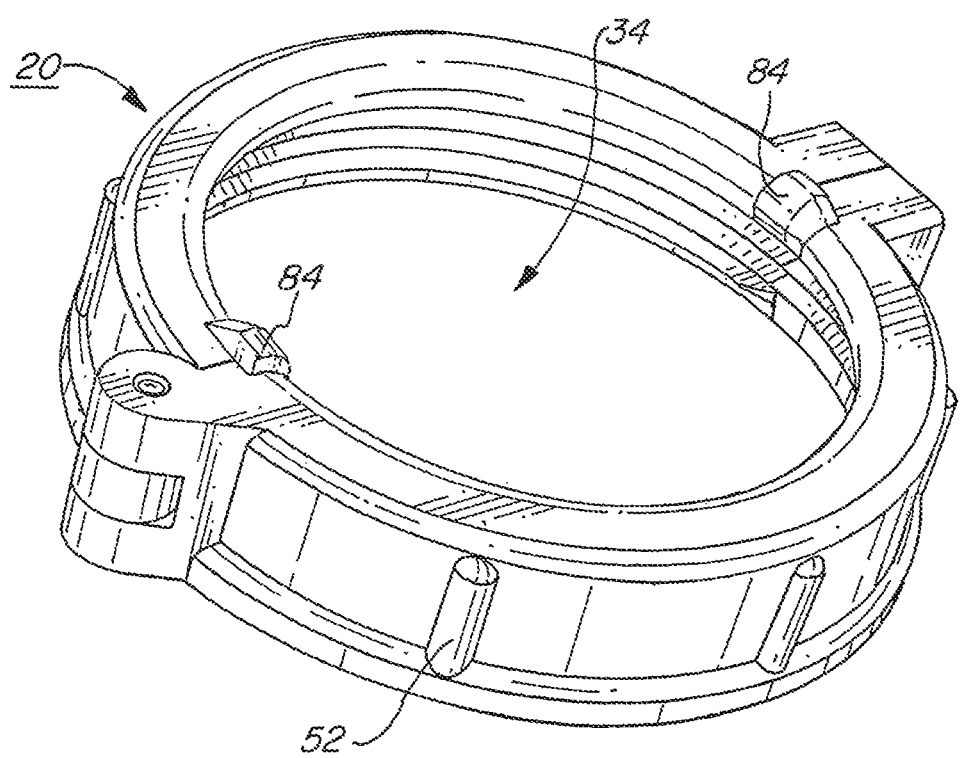
FIG. 2 is a perspective view of the non-metallic electrical insulating bushing shown in FIG. 1 with the bushing in its closed configuration.

As best seen in FIGS. 1, 1A, 1B and 2, a split, non-metallic electrical insulating bushing 20 is configured to rotate from an open position as shown in FIGS. 1A and 1B to a closed position as seen in FIG. 2. FIG. 1 shows the bushing in a disassembled arrangement. In addition, FIG. 11 shows a bottom view of the bushing from the conduit inlet end while FIG. 12 shows a top view of the bushing from the conduit outlet end. The bushing may be specifically configured to have internal threads 22 formed on rims 50 for threaded engagement with threads 24 formed on an end 36 of an electrical conduit 26.

Figure 5:
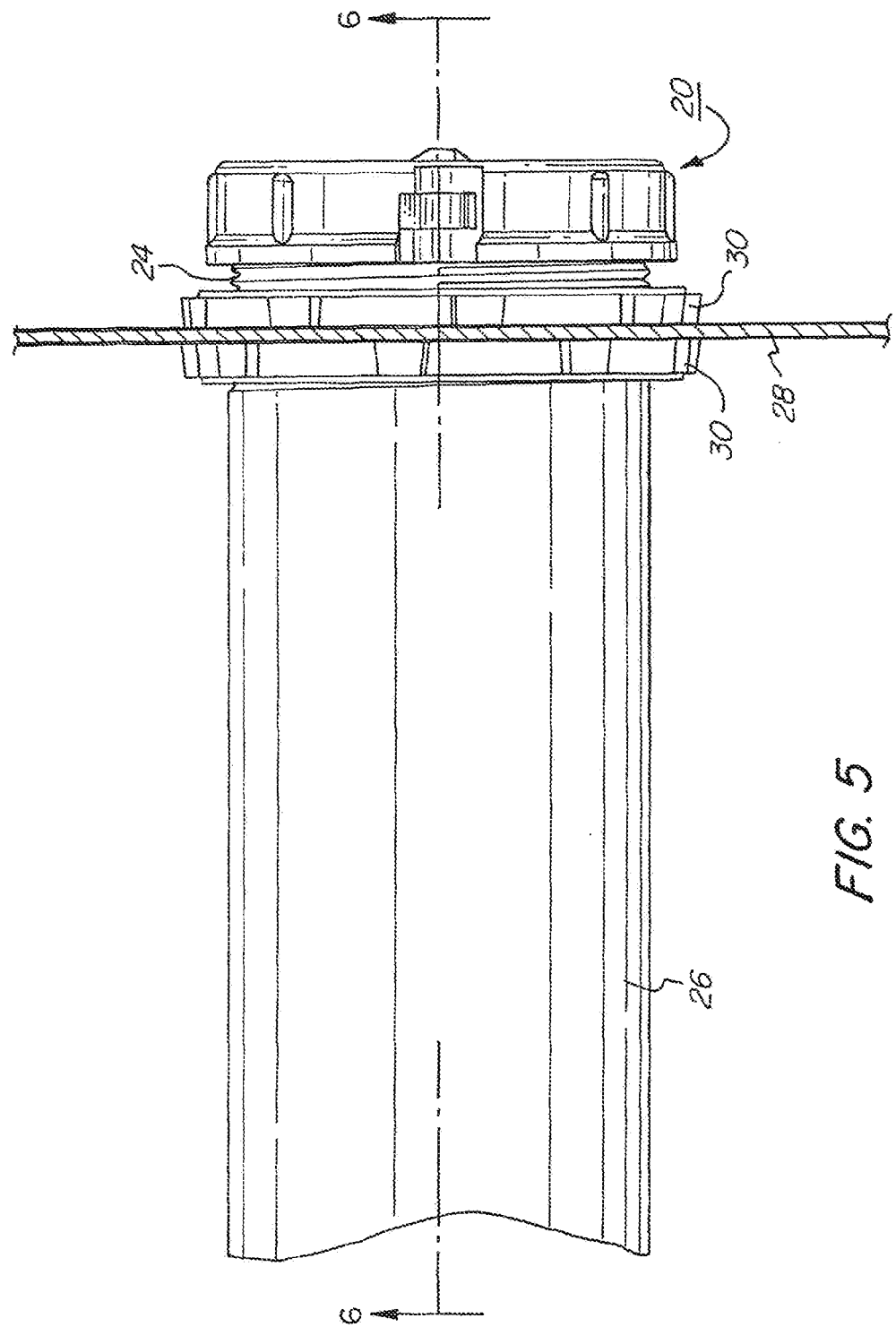
FIG. 5 is a side view of the non-metallic electrical insulating bushing attached to an electrical conduit that is secured to an electrical box or an electrical enclosure by locknuts.
Figure 10:
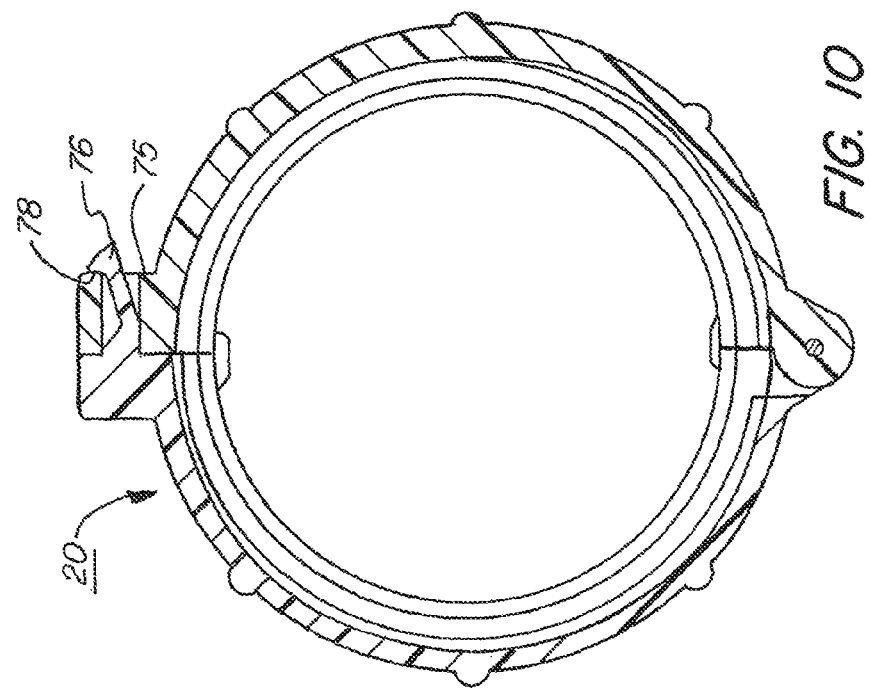
FIG. 10 is a view of the non-metallic electrical insulating bushing taken along line 10-10 of FIG. 9.
Figure 9:
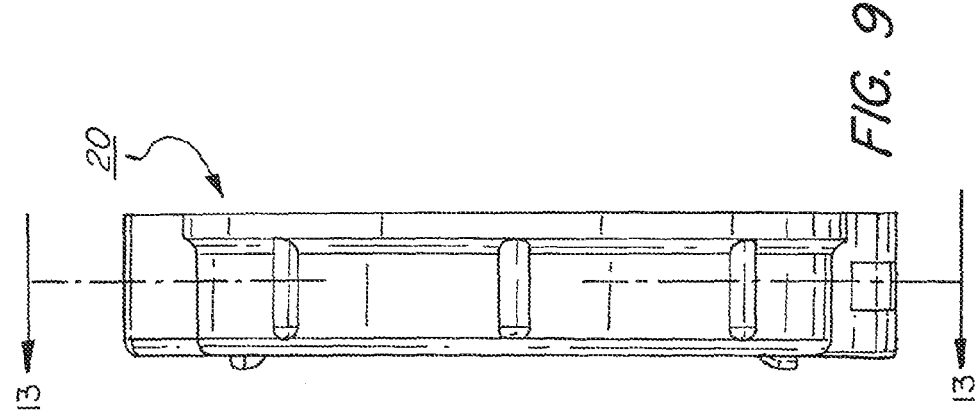
FIG. 9 is a side view of the non-metallic electrical insulating bushing.
Figure 13:
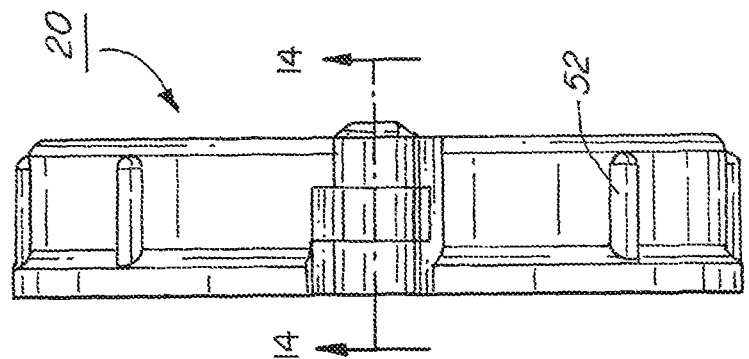
FIG. 13 is a side view of the non-metallic electrical insulating bushing.
Figure 14:
FIG. 14 is a side cross-sectional view of the non-metallic electrical insulating bushing taken along line 14-14 of FIG. 13.

FIGS. 3 and 4 show the insulating bushing threaded to the terminating end 36 of an electrical conduit 26, while FIGS. 5 and 6 show the electrical conduit passing through an opening in an electrical box or electrical enclosure 28 and secured to the box or enclosure by means of locknuts 30.

As seen in FIG. 6, insulated electrical conductors 32 pass through the electrical conduit, as well as through a central opening 34 of the insulating bushing when the bushing is in its closed configuration. Electrical conductors 32 are formed with a conducting core (stranded wire or solid conductor) and an outer insulating covering, the latter of which is shown in FIG. 6. Once the insulating bushing is installed on an end of the electrical conduit, it provides protection to the electrical conductors by preventing chafing of the insulation against the terminating end 36 of the electrical conduit. In this regard, it should be noted that electrical conduits are typically fabricated from metal, such as steel, and therefore their terminating ends have the potential for abrading or chafing the insulation of the electrical conductors, especially if the conductors bend after exiting the conduit.

FIG. 1 shows the three components of the insulating bushing, namely, a first insulating bushing portion 40, a second insulating bushing portion 42 and a hinge pin 44. As seen in FIGS. 1A, 1B and 2, the first and second insulating portions have a rim 50 that has a substantially hemispherical shape. Each bushing portion may include a flange 46 that projects radially inward from the rim so as to optionally overlie terminating end 36 of the electrical conduit 26.

Each hemispherically shaped rim 50 may have internal threads 22 as shown for threaded engagement with threads 24 on electrical conduit 26. Each rim may include ribs 52 formed on the outer surface thereof, the ribs dimensioned to assist gripping of the insulating bushing so as to facilitate installation of the insulating bushing onto the end of an electrical conduit. As seen in FIGS. 1, 1A and 1B, the first insulating bushing portion 40 has a first end 56 that includes at least one bore 58 formed therein for passage of hinge pin 44. In the configuration shown in FIG. 1, the first end of the first insulating portion has a bifurcated configuration with two bores 58 formed therein, one in each bifurcated section 57. Other configurations, such as a non-bifurcated configuration with one bore, could be used.

As seen in FIGS. 1, 1A and 1B, the second insulating bushing portion 42 has a first end 60 with a bore 62 formed therein. Bore 62 is also dimensioned for passage of hinge pin 44.

Although a hinge pin connects the bushing portions to each other, other mechanisms could be used; e.g., projections on one bushing portion and corresponding depressions on the other bushing portion.

As seen in FIGS. 1A, 1B, 8, 10-12, and 15-18, the first insulating bushing portion 40 has a second end 66 that includes a projection clasp member 68 having a hook portion 76. The second insulating bushing portion 42 also has a second end 72 having a recess 74 formed therein about surface 71. The recess may pass through second end 72 and thus passes through a surface 75 of second end 72.

Figure 15:
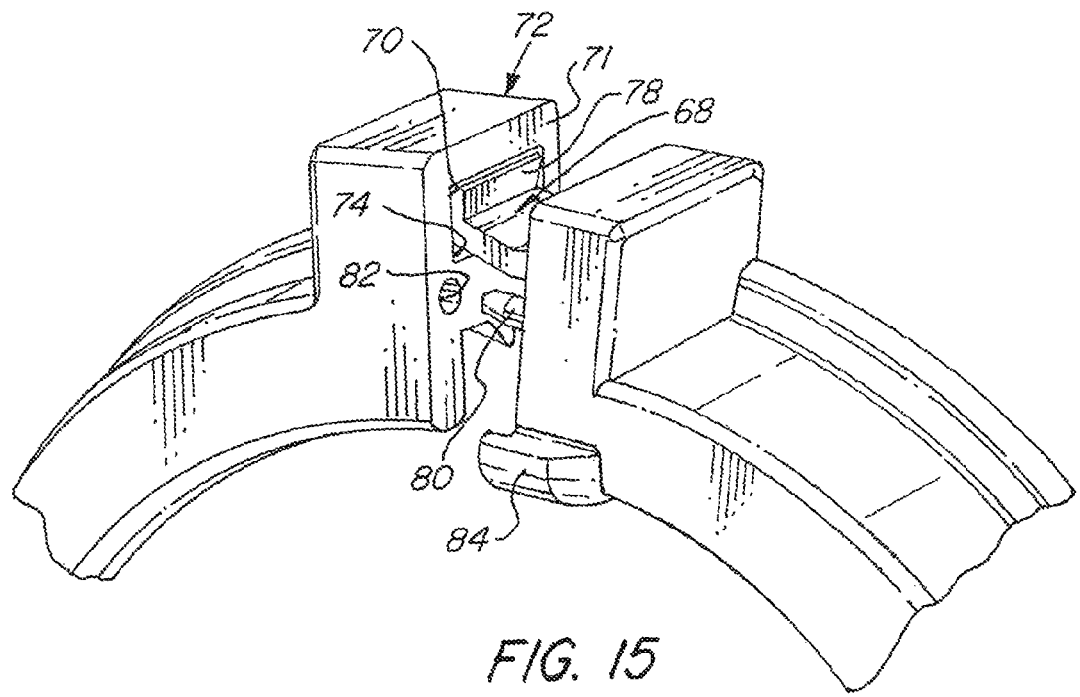
FIG. 15 is an enlarged perspective view of the second ends of the first and second bushing portions as a hook portion of a projection latch member of the first bushing portion initially engages a recess in the second bushing portion.
Figure 16:
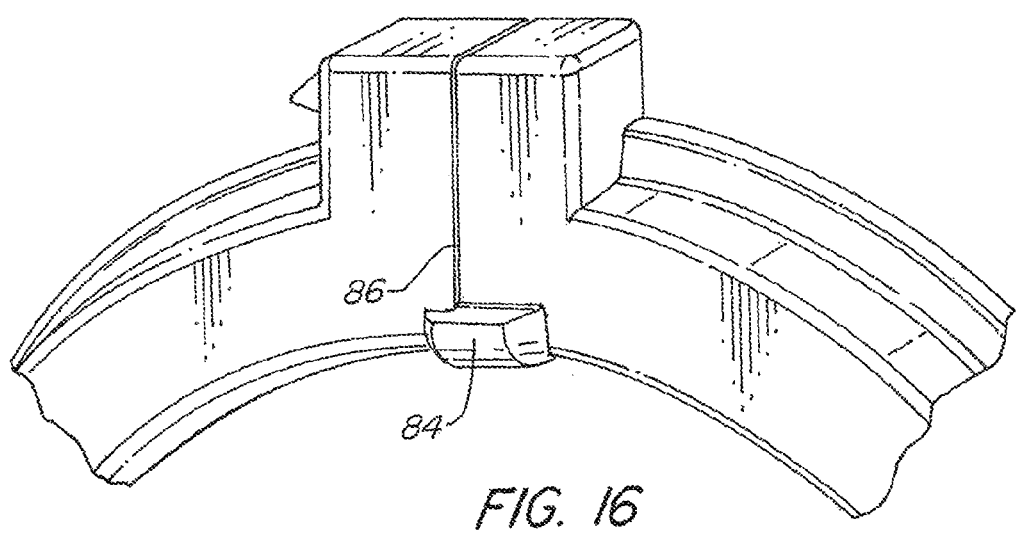
FIG. 16 is an enlarged perspective view of the second ends of the first and second bushing portions when the bushing is in the closed configuration.
Figure 17:
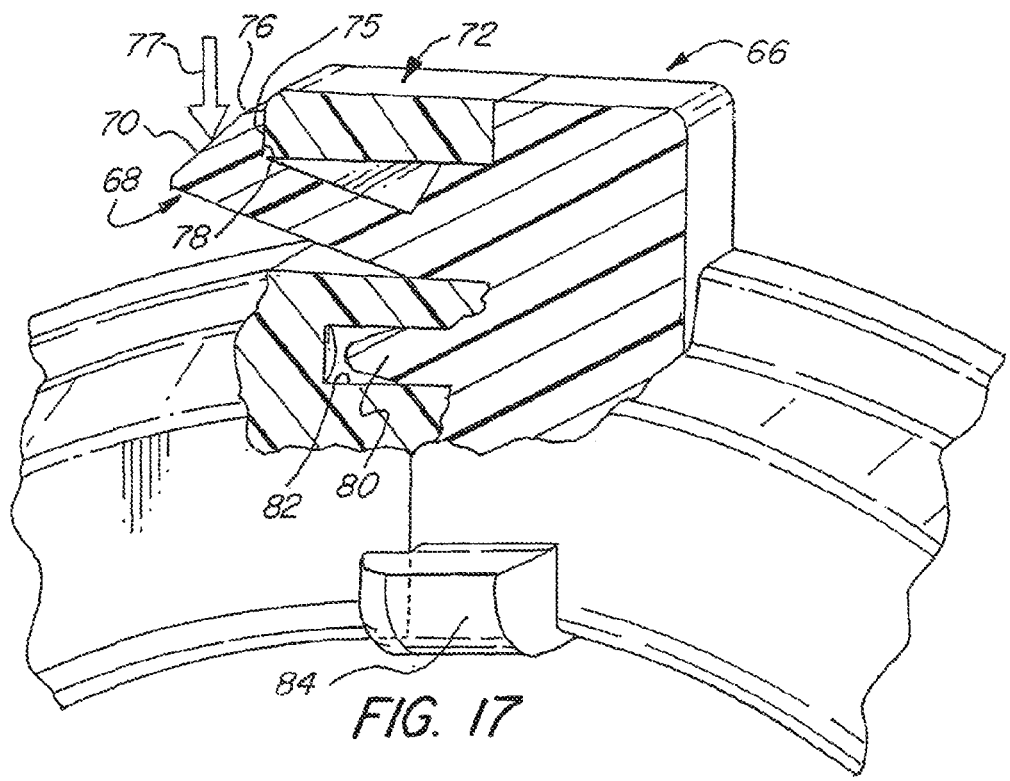
FIG. 17 is an enlarged, partially broken away perspective view of the latch and recess shown in FIG. 16 when the bushing is in the closed configuration.
Figure 18:
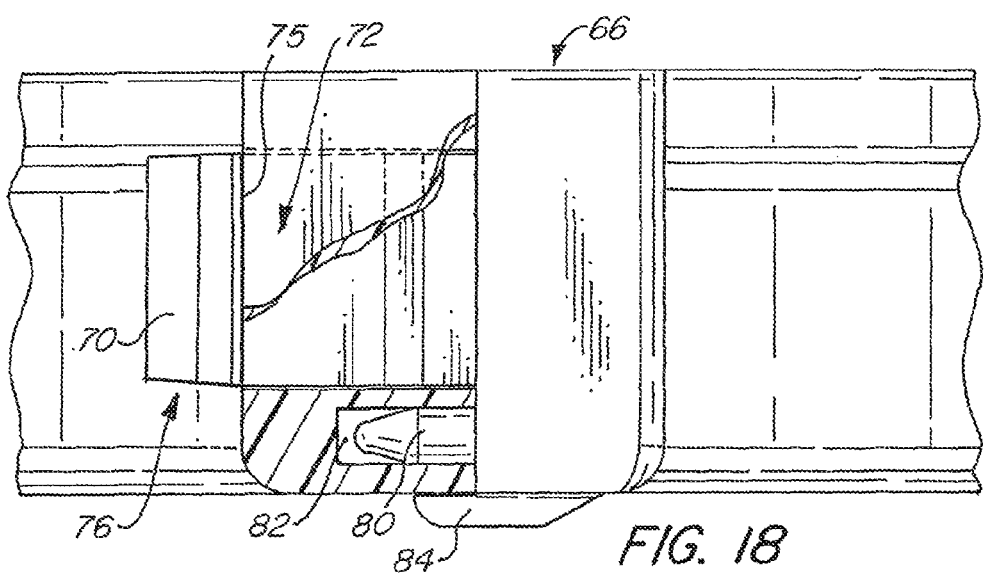
FIG. 18 is an enlarged partially broken away view similar to FIG. 17, taken in a direction toward the circumferential outer perimeter of the bushing.

The projection clasp member 68 is angled relative to the recess 74 when the first insulating bushing portion and the second insulating bushing portion are rotated from their open configuration as shown in FIGS. 1A, 1B, and 15 toward their closed configuration as shown in FIGS. 2 and 16-18 so as to align the second end of the first insulating bushing portion with the second end of the second insulating bushing portion as the projection clasp member is inserted within recess 74. In particular, as best seen in FIG. 15, as hook portion 76 of projection clasp member 68 enters recess 74, surface 70 of the hook portion contacts surface 71 of second end 72 forming recess 74. This causes projection clamp member 68 to self-align with the recess, thereby insuring that the two bushing portions 40 and 42 are aligned with respect to each other. This alignment also helps insure alignment of projection pin 80 with orifice 82 as discussed below.

As also seen in FIGS. 1, 1B, 15, 17 and 18, as the projection clasp member is fully inserted within recess 74, its hook portion 76 projects out of recess 74 so that surface 78 of the hook portion makes contact with surface 75 of second end 72 (see also FIG. 1A) in a snap-action manner. Thus, when the bushing is in its closed configuration, the projection clasp member 68 resists opening of the bushing even when subjected to external forces such as when electrical conductors 32 make contact with the bushing.

As also seen in FIGS. 10-12, 17 and 18, the bushing can still be easily opened by depressing hook portion 76 in the direction of arrow 77, which thereby allows the hook portion and the remainder of the projection clasp member to be withdrawn from recess 74.

As discussed above, the first insulating bushing portion may also include a projecting pin 80, while the second insulating bushing portion may include an orifice 82 which as seen in FIGS. 8, 15, 17 and 18 is positioned for receipt of the projecting pin 80 when the insulating bushing is in its closed configuration. The projecting pin when positioned in orifice 82 provides additional stability to the insulating bushing when in the closed configuration. This additional stability to the insulating bushing when in the closed configuration helps resist accidental opening of the insulating bushing once it has been secured to the end of an electrical conduit.

As also seen in FIGS. 2, 8, 15, 16 and 17, the first insulating bushing portion and the second insulating bushing portion each include a seam cover 84 for overlying gaps 86 between respective first and second ends of the first and second insulating bushing portions. These seam covers thereby minimize any possibility of an electrical conductor coming in contact with either of these gaps 86.

The first and second insulating portions are preferably formed from a thermoplastic materials, such as nylon, polyvinylchloride (PVC), acrylonitrile butadiene styrene (ABS), polycarbonate plastic (PC), and other similar materials. The hinge pin may be fabricated from zinc plated steel and pressed into the orifices formed in the first and second insulating portions.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A split, non-metallic electrical insulating bushing for placement on a terminating end of an electrical conduit, the bushing rotatable between a first open configuration and a second closed configuration comprising:
    a first electrical insulating bushing portion having a substantially hemispherical shape with a first end and a second end, the first bushing portion including a rim,
    a second electrical insulating bushing portion having a substantially hemispherical shape with a first end and a second end, the first end dimensioned to rotate with the first end of the first insulating bushing portion, the second bushing portion including a rim, and
    means for allowing the first end of the first insulating bushing portion and the first end of the second insulating bushing portion to rotate with respect to each other,
    wherein the second end of the first insulating bushing portion comprises a projecting clasp member,
    wherein the second end of the second insulating bushing portion has a recess formed therein dimensioned for receipt of the projecting clasp member,
    wherein the projecting clasp member has a hook portion, the hook portion having a surface angled relative to the recess when the first insulating bushing portion and second insulating bushing portion are rotated toward each other so as to align the second ends of the first insulating portion and the second insulating portion with respect to each other as the hook portion contacts a surface of the second insulating bushing portion forming said recess,
    wherein the hook portion further extends through said recess so as to secure the bushing in its second closed configuration, and
    wherein one end of the first insulating bushing portion has a seam cover that is dimensioned to overlie a gap between said end and the corresponding end of the second insulating bushing portion when the bushing is in the second closed configuration and wherein the second insulating bushing portion includes a seam cover that is dimensioned to overlie a gap between its other end and the corresponding other end of the first insulating bushing portion when the bushing is in the second closed configuration.

2. The split, non-metallic insulating bushing according to claim 1, wherein the hook portion includes an underlying surface for snap secure engagement with the surface of the second insulating bushing portion forming said recess.

3. The split, non-metallic insulating bushing according to claim 1, wherein the second end of the first insulating portion further comprises a projecting pin and wherein the second end of the second insulating portion further has an orifice formed therein dimensioned for receipt of the projecting pin when the split, non-metallic insulating bushing is in its second closed configuration, thereby providing enhanced securement of the split non-metallic insulating bushing when in the second closed configuration.

4. The split, non-metallic insulating bushing according to claim 1, wherein the first bushing portion has a flange attached to the rim that projects radially inward so as to overlie the terminating end of an electrical conduit when installed thereon and wherein the second bushing portion has a flange attached to the rim that projects radially inward so as to overlie the terminating end of an electrical conduit when installed thereon.

5. The split, non-metallic insulating bushing according to claim 1, wherein the rim of the first insulating bushing portion and the rim of the second insulating bushing portion each include threads formed on an interior surface thereof, said threads dimensioned for threading engagement with threads formed on a terminating end of an electrical conduit.

6. The split, non-metallic insulating bushing according to claim 1, wherein the first end of the first insulating bushing portion and the first end of the second insulating bushing portion are rotatably secured to each other by a hinge pin.

7. The split, non-metallic insulating bushing according to claim 6, wherein the hinge pin is fabricated from zinc plated steel.

8. The split, non-metallic insulating bushing according to claim 1, wherein the rim of the first insulating bushing portion and the rim of the second insulating bushing portion end each include a plurality of ribs dimensioned to assist gripping the bushing.

9. The split, non-metallic insulating bushing according to claim 1, wherein the first insulating bushing portion and the second insulating bushing portion are formed from a thermoplastic material.

\* \* \* \* \*